United States Patent
Montero et al.

(10) Patent No.: US 12,367,157 B2
(45) Date of Patent: Jul. 22, 2025

(54) COMPRESSING TRANSLATION LOOKASIDE BUFFER (TLB) TAGS USING A TLB METADATA BUFFER IN PROCESSOR-BASED DEVICES

(71) Applicant: QUALCOMM Incorporated, San Diego, CA (US)

(72) Inventors: Adrian Montero, Austin, TX (US); Conrado Blasco, San Mateo, CA (US); Paul Kitchin, Austin, TX (US); Huzefa Sanjeliwala, Austin, TX (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 18/626,506

(22) Filed: Apr. 4, 2024

(65) Prior Publication Data
US 2024/0273036 A1 Aug. 15, 2024

Related U.S. Application Data

(63) Continuation of application No. 18/168,871, filed on Feb. 14, 2023, now Pat. No. 12,130,751.

(51) Int. Cl.
G06F 12/1027 (2016.01)
G06F 9/455 (2018.01)

(52) U.S. Cl.
CPC ...... *G06F 12/1027* (2013.01); *G06F 9/45558* (2013.01); *G06F 2009/45583* (2013.01)

(58) Field of Classification Search
CPC ............. G06F 12/1027; G06F 9/45558; G06F 2009/45583
See application file for complete search history.

(56) References Cited

U.S. PATENT DOCUMENTS

2011/0040950 A1* 2/2011 Handgen ............. G06F 12/1027
711/206
2015/0370590 A1* 12/2015 Tuch ...................... G06F 9/461
718/1

(Continued)

OTHER PUBLICATIONS

International Search Report and Written Opinion for International Patent Application No. PCT/US2024/011237, mailed Apr. 29, 2024, 15 pages.

(Continued)

*Primary Examiner* — Sean D Rossiter
(74) *Attorney, Agent, or Firm* — W & T

(57) ABSTRACT

Compressing translation lookaside buffer (TLB) tags using a TLB metadata buffer in processor-based devices is disclosed herein. In some aspects, a processor-based device provides a memory management unit (MMU) that includes a TLB and a TLB metadata buffer comprising a plurality of TLB metadata buffer entries storing corresponding TLB metadata. The MMU is configured to select a TLB metadata buffer entry for use in accessing the TLB of the processor-based device. After selecting the TLB metadata buffer entry, the MMU stores a pointer to the TLB metadata buffer entry as an active TLB metadata pointer. When the MMU subsequently receives a memory access request comprising a virtual address (VA), the MMU generates a TLB entry in the TLB for the VA, and stores the active TLB metadata pointer as part of the TLB tag of the TLB entry in lieu of the TLB metadata of the TLB metadata buffer entry.

17 Claims, 8 Drawing Sheets

(56) References Cited

U.S. PATENT DOCUMENTS

| | | | |
|---|---|---|---|
| 2016/0140050 A1* | 5/2016 | Kujtkowski | G06F 12/1027 |
| | | | 711/108 |
| 2016/0378668 A1* | 12/2016 | Roberts | G06F 12/0862 |
| | | | 711/137 |
| 2018/0173641 A1 | 6/2018 | Parker et al. | |
| 2019/0079867 A1 | 3/2019 | García Guirado et al. | |
| 2022/0066947 A1* | 3/2022 | Pape | G06F 12/1027 |
| 2024/0134794 A1* | 4/2024 | Smekalov | G06F 12/0891 |

OTHER PUBLICATIONS

Seznec A., "Don't Use the Page Number, But A Pointer To It", Institute of Electrical and Electronics Engineers Association for Computing Machinery, Proceedings of the 23rd. Annual Symposium on Computer Architecture. Philadelphia, May 22-24, 1996, [Proceedings of the Annual Symposium on Computer Architecture], New York, ACM/IEEE, US, vol. SYMP. 23, May 22, 1996, pp. 104-113, XP010868073, Abstract.

U.S. Appl. No. 18/168,871, filed Feb. 14, 2023.

* cited by examiner

COMPRESSING TRANSLATION LOOKASIDE BUFFER (TLB) TAGS USING A TLB METADATA BUFFER IN PROCESSOR-BASED DEVICES

PRIORITY APPLICATION

The present application is a continuation of and claims priority to U.S. patent application Ser. No. 18/168,871, filed Feb. 14, 2023 and entitled "COMPRESSING TRANSLATION LOOKASIDE BUFFER (TLB) TAGS USING A TLB METADATA BUFFER IN PROCESSOR-BASED DEVICES," which is incorporated herein by reference in its entirety.

BACKGROUND

I. Field of the Disclosure

The technology of the disclosure relates generally to translation lookaside buffers (TLB) in processor-based devices.

II. Background

Microprocessors, also referred to herein as "processors," perform computational tasks for a wide variety of applications. Conventional processors make use of virtual memory, which refers to a memory management mechanism that maps memory addresses (i.e., virtual addresses or VAs) referenced by executing processes to physical addresses (PAs) within system memory. By using virtual memory, processor-based systems are able to provide access to a virtual memory space larger than the actual physical memory space, and to enhance inter-process security through memory isolation. The mapping of VAs to their corresponding PAs is accomplished using data structures known as page tables. To further improve performance, page table entries retrieved from the page tables during VA-to-PA translations are cached in a data structure referred to as a translation lookaside buffer, or TLB.

While the use of a TLB may be effective in reducing memory access latency within a processor, the TLB may require a significant portion of the physical area of the processor. This issue may be more frequently encountered as instruction set architectures (ISAs) increase the size of data such as VAs, application space identifiers (ASIDs), and virtual machine identifiers (VMIDs) may be conventionally stored as part of the tag of each TLB entry. Accordingly, it may be desirable to reduce the area occupied by the TLB without negatively affecting the TLB's lookup latency, and while minimizing TLB invalidations.

SUMMARY OF THE DISCLOSURE

Aspects disclosed in the detailed description include compressing translation lookaside buffer (TLB) tags using a TLB metadata buffer in processor-based devices. Related apparatus and methods are also disclosed. In this regard, in some exemplary aspects disclosed herein, a processor of a processor-based device provides a memory management unit (MMU) that includes a TLB and a TLB metadata buffer. The TLB metadata buffer comprises a plurality of TLB metadata buffer entries that each stores corresponding TLB metadata. The TLB metadata may include any data that is conventionally stored as part of the tag of a TLB entry, and that may be duplicated in multiple TLB entries during execution of a software process. Thus, as non-limiting examples, the TLB metadata in some aspects may comprise an application space identifier (ASID) and a virtual machine identifier (VMID) of a processor context, while some aspects may provide that the TLB metadata comprises a plurality of upper bits of a virtual address (VA) of a memory region in use by a processor pipeline of the processor.

In exemplary operation, the MMU of the processor-based device selects a TLB metadata buffer entry for use in accessing the TLB of the processor-based device by, e.g., selecting a TLB metadata buffer entry storing an ASID and a VMID of a new processor context as TLB metadata, or selecting a TLB metadata buffer entry storing the upper bits of a VA of a memory region, in use by a processor pipeline from which a memory access request is received, as TLB metadata. After selecting the TLB metadata buffer entry, the MMU stores a pointer to the TLB metadata buffer entry as the active TLB metadata pointer. When the MMU subsequently receives a memory access request comprising a VA, the MMU generates a TLB entry in the TLB for the VA, and stores the active TLB metadata pointer as part of the tag of the TLB entry in lieu of the TLB metadata of the TLB metadata buffer entry. Some aspects may further provide that when the MMU receives another memory request comprising the VA, the MMU accesses the TLB entry based on the active TLB metadata pointer (e.g., by using the active TLB metadata pointer to match the TLB tag of the TLB entry). In this manner, aspects disclosed herein allow the tag of each TLB entry to be smaller in size without affecting TLB latency, and with the added benefit of simplified TLB content addressable memory (CAM) logic.

In aspects in which the TLB metadata stored in the TLB metadata buffer entries comprises an ASID and a VMID of a processor context, the MMU is configured to detect a processor context switch to a new context associated with an ASID and a VMID. According to some aspects, if no TLB metadata buffer entry stores corresponding TLB metadata comprising the ASID and the VMID of the new context, the MMU may allocate such a TLB metadata buffer entry. The MMU then selects the TLB metadata buffer entry storing the corresponding TLB metadata comprising the ASID and the VMID of the new context for use in accessing the TLB, and stores a pointer to the TLB metadata buffer entry in an active pointer table entry of an active pointer table. Some such aspects provide that the TLB metadata buffer entry further comprises a translation regime indicator, and the MMU stores the pointer to the TLB metadata buffer entry in an active pointer table entry that corresponds to the translation regime indicated by the translation regime indicator of the TLB metadata buffer entry. Some aspects further provide that that the TLB metadata buffer entry further comprises a global indicator, which, if set, indicates that any associated TLB entries may be used across multiple applications (i.e., only the VMID of the TLB entry is required to match). In these aspects, the MMU stores the pointer to the TLB metadata buffer entry as the global active TLB metadata pointer of the active pointer table entry.

In aspects in which the TLB metadata stored in the TLB metadata buffer entries comprises a plurality of upper bits of a VA of a memory region in use by a processor pipeline of the processor, the MMU is configured to receive a memory access request that comprises the VA and is associated with a processor pipeline of a plurality of processor pipelines of the processor-based device. According to some aspects, if no TLB metadata buffer entry stores corresponding TLB metadata comprising the upper bits of the VA, the MMU may allocate such a TLB metadata buffer entry. The MMU selects the TLB metadata buffer entry storing the corresponding TLB metadata comprising the plurality of upper bits of the VA for use in accessing the TLB, and stores the pointer to the TLB metadata buffer entry in an active pointer table entry, corresponding to the processor pipeline, of the active pointer table entries of the active pointer table.

In another aspect, a processor-based device is disclosed. The processor-based device comprises a TLB comprising a plurality of TLB entries, and also comprises a TLB metadata buffer comprising a plurality of TLB metadata buffer entries each configured to store corresponding TLB metadata. The processor-based device further comprises an MMU configured to select a TLB metadata buffer entry among the plurality of TLB metadata buffer entries for use in accessing the TLB. The MMU is further configured to store a pointer to the TLB metadata buffer entry as an active TLB metadata pointer. The MMU is also configured to receive a first memory access request comprising a first VA. The MMU is additionally configured to, responsive to receiving the first memory access request, generate a TLB entry in the TLB for the first VA, the TLB entry comprising a TLB tag that stores the active TLB metadata pointer in lieu of the TLB metadata of the TLB metadata buffer entry.

In another aspect, a processor-based device is disclosed. The processor-based device comprises means for selecting a TLB metadata buffer entry of a plurality of TLB metadata buffer entries of a TLB metadata buffer for use in accessing a TLB of the processor-based device, the plurality of TLB metadata buffer entries each configured to store corresponding TLB metadata. The processor-based device further comprises means for storing a pointer to the TLB metadata buffer entry as an active TLB metadata pointer. The processor-based device also comprises means for receiving a first memory access request comprising a first VA. The processor-based device additionally comprises means for generating a TLB entry in the TLB for the first VA, the TLB entry comprising a TLB tag that stores the active TLB metadata pointer in lieu of the TLB metadata of the TLB metadata buffer entry, responsive to receiving the first memory access request.

In another aspect, a method for compressing TLB tags using a TLB metadata buffer in processor-based devices is disclosed. The method comprises selecting, by an MMU of a processor-based device, a TLB metadata buffer entry of a plurality of TLB metadata buffer entries of a TLB metadata buffer for use in accessing a TLB of the processor-based device, the plurality of TLB metadata buffer entries each configured to store corresponding TLB metadata. The method further comprises storing, by the MMU, a pointer to the TLB metadata buffer entry as an active TLB metadata pointer. The method also comprises receiving, by the MMU, a first memory access request comprising a first VA. The method additionally comprises, responsive to receiving the first memory access request, generating, by the MMU, a TLB entry in the TLB for the first VA, the TLB entry comprising a TLB tag that stores the active TLB metadata pointer in lieu of the TLB metadata of the TLB metadata buffer entry.

In another aspect, a non-transitory computer-readable medium is disclosed. The non-transitory computer-readable medium stores computer-executable instructions that, when executed, cause a processor of a processor-based device to select a TLB metadata buffer entry of a plurality of TLB metadata buffer entries of a TLB metadata buffer for use in accessing a TLB of the processor-based device, the plurality of TLB metadata buffer entries each configured to store corresponding TLB metadata. The computer-executable instructions further cause the processor to store a pointer to the TLB metadata buffer entry as an active TLB metadata pointer. The computer-executable instructions also cause the processor to receive a first memory access request comprising a first VA. The computer-executable instructions additionally cause the processor to, responsive to receiving the first memory access request, generate a TLB entry in the TLB for the first VA, the TLB entry comprising a TLB tag that stores the active TLB metadata pointer in lieu of the TLB metadata of the TLB metadata buffer entry.

DETAILED DESCRIPTION

Figure 1:
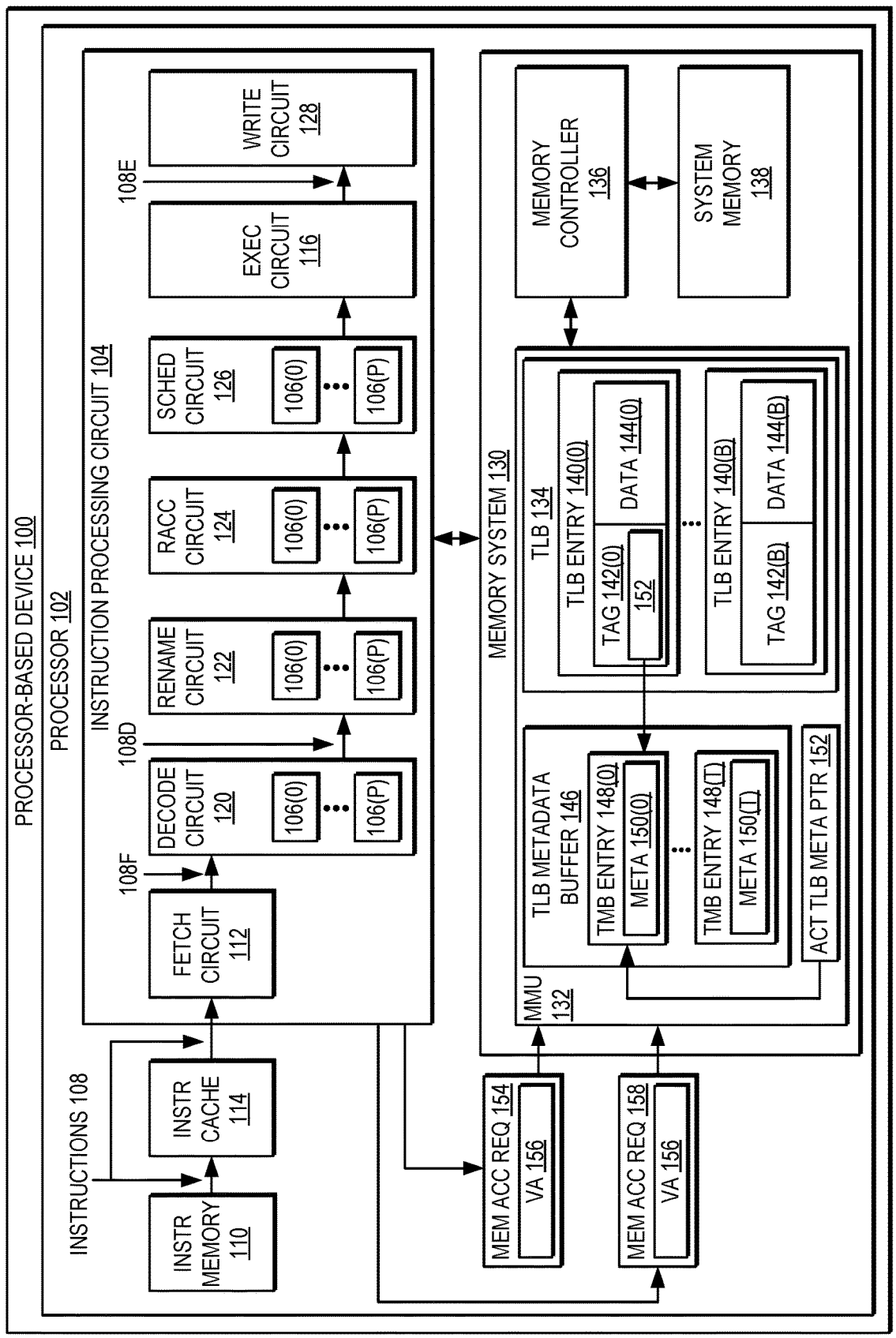
FIG. 1 is a block diagram of an exemplary processor-based device including a memory management unit (MMU) and a translation lookaside buffer (TLB) configured to compress TLB tags using a TLB metadata buffer, according to some aspects.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include compressing translation lookaside buffer (TLB) tags using a TLB metadata buffer in processor-based devices. Related apparatus and methods are also disclosed. In this regard, in some exemplary aspects disclosed herein, a processor of a processor-based device provides a memory management unit (MMU) that includes a TLB and a TLB metadata buffer. The TLB metadata buffer comprises a plurality of TLB metadata buffer entries that each stores corresponding TLB metadata. The TLB metadata may include any data that is conventionally stored as part of the tag of a TLB entry, and that may be duplicated in multiple TLB entries during execution of a software process. Thus, as non-limiting examples, the TLB metadata in some aspects may comprise an application space identifier (ASID) and a virtual machine identifier (VMID) of a processor context, while some aspects may provide that the TLB metadata comprises a plurality of upper bits of a virtual address (VA) of a memory region in use by a processor pipeline of the processor.

In exemplary operation, the MMU of the processor-based device selects a TLB metadata buffer entry for use in accessing the TLB of the processor-based device by, e.g., selecting a TLB metadata buffer entry storing an ASID and a VMID of a new processor context as TLB metadata, or selecting a TLB metadata buffer entry storing the upper bits of a VA of a memory region, in use by a processor pipeline from which a memory access request is received, as TLB metadata. After selecting the TLB metadata buffer entry, the MMU stores a pointer to the TLB metadata buffer entry as the active TLB metadata pointer. When the MMU subsequently receives a memory access request comprising a VA, the MMU generates a TLB entry in the TLB for the VA, and stores the active TLB metadata pointer as part of the tag of the TLB entry in lieu of the TLB metadata of the TLB metadata buffer entry. Some aspects may further provide that when the MMU receives another memory request comprising the VA, the MMU accesses the TLB entry based on the active TLB metadata pointer (e.g., by using the active TLB metadata pointer to match the TLB tag of the TLB entry). In this manner, aspects disclosed herein allow the tag of each TLB entry to be smaller in size without affecting TLB latency, and with the added benefit of simplified TLB content addressable memory (CAM) logic.

In aspects in which the TLB metadata stored in the TLB metadata buffer entries comprises an ASID and a VMID of a processor context, the MMU is configured to detect a processor context switch to a new context associated with an ASID and a VMID. According to some aspects, if no TLB metadata buffer entry stores corresponding TLB metadata comprising the ASID and the VMID of the new context, the MMU may allocate such a TLB metadata buffer entry. The MMU then selects the TLB metadata buffer entry storing the corresponding TLB metadata comprising the ASID and the VMID of the new context for use in accessing the TLB, and stores a pointer to the TLB metadata buffer entry in an active pointer table entry of an active pointer table. Some such aspects provide that the TLB metadata buffer entry further comprises a translation regime indicator, and the MMU stores the pointer to the TLB metadata buffer entry in an active pointer table entry that corresponds to the translation regime indicated by the translation regime indicator of the TLB metadata buffer entry. Some aspects further provide that that the TLB metadata buffer entry further comprises a global indicator, which, if set, indicates that any associated TLB entries may be used across multiple applications (i.e., only the VMID of the TLB entry is required to match). In these aspects, the MMU stores the pointer to the TLB metadata buffer entry as the global active TLB metadata pointer of the active pointer table entry.

In aspects in which the TLB metadata stored in the TLB metadata buffer entries comprises a plurality of upper bits of a VA of a memory region in use by a processor pipeline of the processor, the MMU is configured to receive a memory access request that comprises the VA and is associated with a processor pipeline of a plurality of processor pipelines of the processor-based device. According to some aspects, if no TLB metadata buffer entry stores corresponding TLB metadata comprising the upper bits of the VA, the MMU may allocate such a TLB metadata buffer entry. The MMU selects the TLB metadata buffer entry storing the corresponding TLB metadata comprising the plurality of upper bits of the VA for use in accessing the TLB, and stores the pointer to the TLB metadata buffer entry in an active pointer table entry, corresponding to the processor pipeline, of the active pointer table entries of the active pointer table.

In this regard, FIG. 1 is a diagram of an exemplary processor-based device 100 that includes a processor 102. The processor 102, which also may be referred to as a "processor core" or a "central processing unit (CPU) core," may be an in-order or an out-of-order processor (OoP), and/or may be one of a plurality of processors 102 provided by the processor-based device 100. In the example of FIG. 1, the processor 102 includes an instruction processing circuit 104 that includes one or more processor pipelines 106(0)-106(P) for processing instructions 108 fetched from an instruction memory (captioned as "INSTR MEMORY" in FIG. 1) 110 by a fetch circuit 112 for execution. The instruction memory 110 may be provided in or as part of a system memory in the processor-based device 100, as a non-limiting example. An instruction cache (captioned as "INSTR CACHE" in FIG. 1) 114 may also be provided in the processor 102 to cache the instructions 108 fetched from the instruction memory 110 to reduce latency in the fetch circuit 112.

The fetch circuit 112 in the example of FIG. 1 is configured to provide the instructions 108 as fetched instructions 108F into the one or more processor pipelines 106(0)-106(P) in the instruction processing circuit 104 to be pre-processed, before the fetched instructions 108F reach an execution circuit (captioned as "EXEC CIRCUIT" in FIG. 1) 116 to be executed. The processor pipelines 106(0)-106(P) are provided across different processing circuits or stages of the instruction processing circuit 104 to pre-process and process the fetched instructions 108F in a series of steps that can be performed concurrently to increase throughput prior to execution of the fetched instructions 108F by the execution circuit 116.

With continuing reference to FIG. 1, the instruction processing circuit 104 includes a decode circuit 120 configured to decode the fetched instructions 108F fetched by the fetch circuit 112 into decoded instructions 108D to determine the instruction type and actions required. The instruction type and action required encoded in the decoded instruction 108D may also be used to determine in which processor pipeline 106(0)-106(P) the decoded instructions 108D should be placed. In this example, the decoded instructions 108D are placed in one or more of the processor pipelines 106(0)-106(P) and are next provided to a rename circuit 122 in the instruction processing circuit 104. The rename circuit 122 is configured to determine if any register names in the decoded instructions 108D should be renamed to decouple any register dependencies that would prevent parallel or out-of-order processing.

The instruction processing circuit 104 in the processor 102 in FIG. 1 also includes a register access circuit (captioned as "RACC CIRCUIT" in FIG. 1) 124. The register access circuit 124 is configured to access a physical register in a physical register file (PRF) (not shown) based on a mapping entry mapped to a logical register in a register mapping table (RMT) (not shown) of a source register operand of a decoded instruction 108D to retrieve a produced value from an executed instruction 108E in the execution circuit 116. The register access circuit 124 is also configured to provide the retrieved produced value from an executed instruction 108E as the source register operand of a decoded instruction 108D to be executed.

Also, in the instruction processing circuit 104, a scheduler circuit (captioned as "SCHED CIRCUIT" in FIG. 1) 126 is provided in the processor pipeline 106(0)-106(P) and is configured to store decoded instructions 108D in reservation entries until all source register operands for the decoded instruction 108D are available. The scheduler circuit 126 issues decoded instructions 108D that are ready to be executed to the execution circuit 116. A write circuit 128 is also provided in the instruction processing circuit 104 to write back or commit produced values from executed instructions 108E to memory (such as the PRF), cache memory, or system memory.

As seen in FIG. 1, the processor-based device 100 further includes a memory system 130 providing an MMU 132 that is configured to manage memory accesses. The MMU 132 provides a TLB 134, which is a cache of recently executed translations of virtual addresses to physical addresses (PAs), performed by the MMU 132, for memory pages containing instructions or data to be retrieved. The MMU 132 of FIG. 1 is also communicatively coupled to a memory controller 136 that is configured to perform memory read and write operations on a system memory 138. The system memory 138 in some aspects may comprise double data rate (DDR) synchronous dynamic random access memory (SDRAM), as a non-limiting example.

The MMU 132 of FIG. 1 is responsible for performing VA-to-PA address translation operations in support of the virtual memory functionality of the processor-based device 100. In this regard, the MMU 132 according to some aspects may comprise a plurality of hierarchical page tables (not shown) containing page table entries that each represent a mapping for a subdivision of the addressable virtual memory space having a specific size (i.e., a memory page). The mappings stored by the page table entries of the hierarchical page tables of the MMU 132 may be cached in a plurality of TLB entries 140(0)-140(B) of the TLB 134, each of which comprises corresponding TLB tags (captioned as "TAG" in FIG. 1) 142(0)-142(B) and data elements (captioned as "DATA" in FIG. 1) 144(0)-144(B). Each of the TLB tags 142(0)-142(B) may comprise a virtual page address, and may also include an ASID (not shown) to enable processor context switches without requiring the TLB 134 to be invalidated, and a VMID (not shown) to enable hypervisor virtual machine (VM) switches without requiring the TLB 134 to be invalidated. Each data element 144(0)-144(B) may comprise a corresponding PA for the TLB entry 140(0)-140(B). The TLB entries 140(0)-140(B) may further include additional metadata not shown in FIG. 1, such as validity indicators, global indicators, and/or memory properties such as type and access permissions.

As noted above, the TLB 134 may require a significant portion of the physical area of the processor 102, an issue which may be exacerbated as the size of data such as VAs, ASIDs, and VMIDs that are conventionally stored as part of the TLB tags 142(0)-142(B) of the TLB entries 140(0)-140(B) increases in size. In this regard, the MMU 132 provides a TLB metadata buffer 146 that comprises a plurality of TLB metadata buffer entries (captioned as "TMB ENTRY" in FIG. 1) 148(0)-148(T). Each of the TLB metadata buffer entries 148(0)-148(T) stores corresponding TLB metadata (captioned as "META" in FIG. 1) 150(0)-150(T), which may comprise any data that is conventionally stored as part of the TLB tags 142(0)-142(B) of the TLB entries 140(0)-140(B), and that may be duplicated in multiple TLB entries 140(0)-140(B) during execution of a software process by the processor 102. Thus, in aspects such as those discussed below with respect to FIG. 2, the TLB metadata 150(0)-150(T) may comprise an ASID and a VMID of a processor context, while some aspects such as those discussed below with respect to FIG. 3 may provide that the TLB metadata 150(0)-150(T) comprises a plurality of upper bits of a VA of a memory region in use by a processor pipeline 106(0)-106(P) of the processor 102.

In exemplary operation, the MMU 132 selects a TLB metadata buffer entry, such as the TLB metadata buffer entry 148(0), for use in accessing the TLB 134 of the processor-based device 100 (based on, e.g., a processor context switch or a memory access request from the processor pipelines 106(0)-106(P)). The MMU 132 then stores a pointer to the TLB metadata buffer entry 148(0) (i.e., an index of the TLB metadata buffer entry 148(0) within the TLB metadata buffer 146) as an active TLB metadata pointer (captioned as "ACT TLB META PTR" in FIG. 1) 152. When the MMU 132 receives a memory access request (captioned as "MEM ACC REQ" in FIG. 1) 154 comprising a VA 156, the MMU 132, as part of address translation operations, generates a TLB entry (e.g., the TLB entry 140(0)) in the TLB 134 for the VA 156. The MMU 132 stores the active TLB metadata pointer 152 as part of the TLB tag 142(0) in lieu of the TLB metadata 150(0) of the TLB metadata buffer entry 148(0), which would conventionally be stored as part of the TLB tag 142(0). When the MMU 132 receives another memory access request 158 comprising the VA 156, the MMU 132 may access the TLB entry 140(0) based on the active TLB metadata pointer 152 (e.g., by using the active TLB metadata pointer 152 to match the TLB tag 142(0) of the TLB entry 140(0)).

As discussed above, the processor 102 may fetch and process instructions concurrently in the processor pipelines 106(0)-106(P), which enables multiple processes (not shown) to be executed in parallel by the processor 102. Such a process is assigned an ASID by an operating system (OS) executed by the processor 102, and is also allocated its own set of translation tables for use by the MMU 132 in performing VM-to-PA translation operations. Upon a processor context switch (i.e., a transfer of execution from a first process to a second process), the processor 102 saves the execution state of the first process and restores the execution state of the second process. The processor 102 also switches translation table entries to those of the second process as part of the processor context switch. To eliminate the need to flush a conventional TLB for every processor context switch, the conventional TLB stores the ASID of a specific process as part of the TLB tag of each TLB entry, allowing multiple TLB entries for a given memory page that is in use by different processes to be present in the TLB. In similar fashion, when a process is being executed within a VM that itself is executing within a hypervisor, a conventional TLB also store the VMID of the VM as part of the TLB tag of each TLB entry to eliminate the need to flush the TLB on a VM switch.

Figure 2:
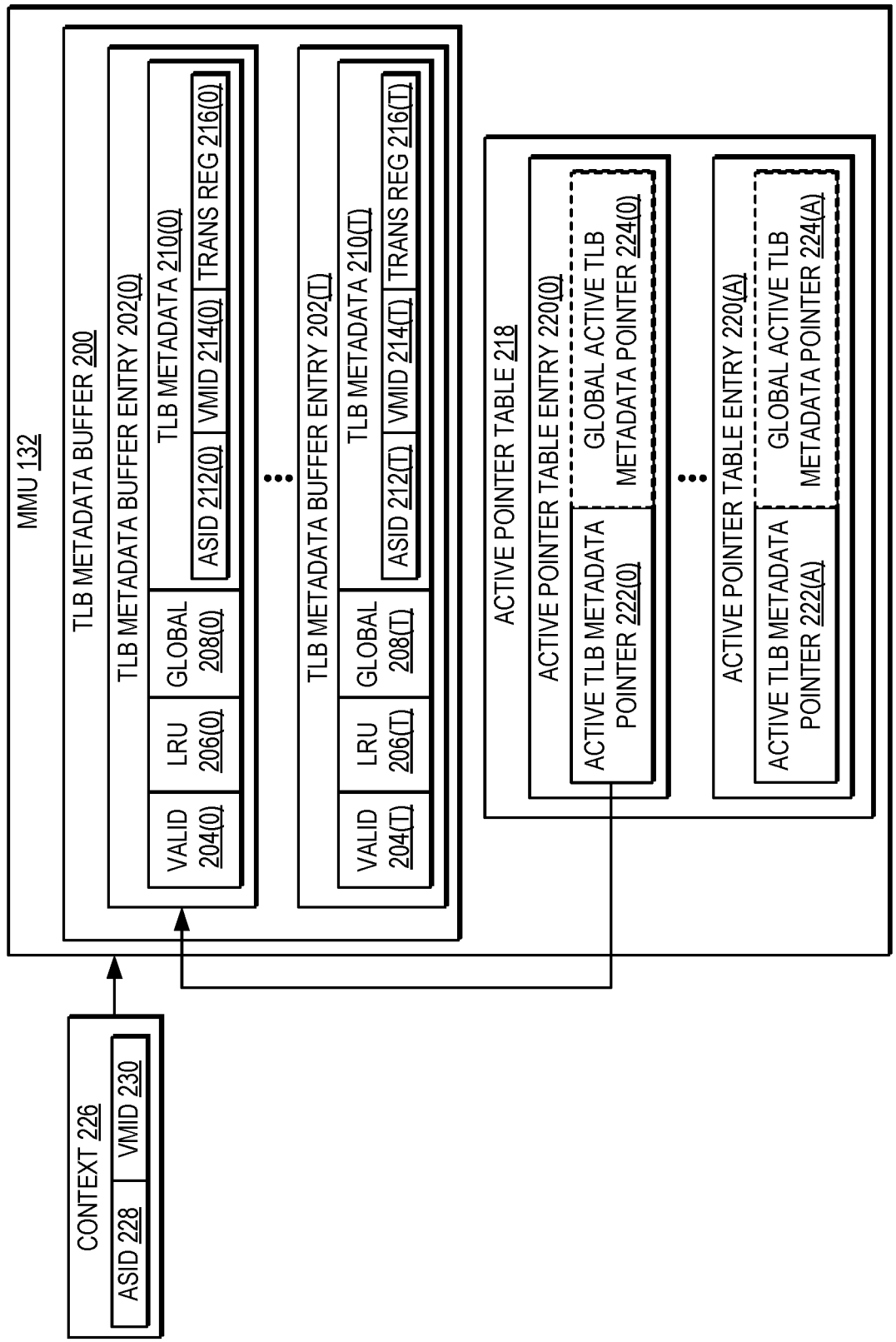
FIG. 2 is a block diagram of an exemplary aspect of the MMU of FIG. 1 in which the TLB metadata buffer stores TLB metadata comprising application space identifiers (ASIDs) and virtual machine identifiers (VMIDs) for multiple translation regimes in response to processor context switches, according to some aspects.

To compress the size of TLB tags while providing ASIDs and VMIDs for different processes, some aspects of the MMU 132 of FIG. 1 provide support for storing TLB metadata that includes the ASIDs and the VMIDs. In this regard, FIG. 2 illustrates an exemplary aspect of the MMU 132 of FIG. 1. As seen in FIG. 2, the MMU 132 includes a TLB metadata buffer 200 that corresponds in functionality to the TLB metadata buffer 146 of FIG. 1. The TLB metadata buffer 200 stores a plurality of TLB metadata buffer entries 202(0)-202(T) that correspond in functionality to the TLB metadata buffer entries 148(0)-148(T) of FIG. 1. In the example of FIG. 2, the TLB metadata buffer entries 202(0)-202(T) include respective validity indicators (captioned as "VALID" in FIG. 2) 204(0)-204(T) and respective least-recently-used (LRU) data (captioned as "LRU" in FIG. 2) 206(0)-206(T). The TLB metadata buffer entries 202(0)-202(T) in FIG. 2 further include global indicators (captioned as "GLOBAL" in FIG. 2) 208(0)-208(T) that indicate whether an associated TLB entry 140(0)-140(B) of the TLB 134 of FIG. 1 is available to multiple processes. The TLB metadata buffer entries 202(0)-202(T) also include respective TLB metadata 210(0)-210(T), which comprises ASIDs 212(0)-212(T) and VMIDs 214(0)-214(T). Because different translation regimes (e.g., EL2, EL2&0, EL1&0, and the like) may be used during a given processor context, the TLB metadata 210(0)-210(T) also include respective translation regime indicators (captioned as "TRANS REG" in FIG. 2) 216(0)-216(T).

The MMU 132 further provides an active pointer table 218 that stores a plurality of active pointer table entries 220(0)-220(A). Each of the active pointer table entries 220(0)-220(A) stores a respective active TLB metadata pointer 222(0)-222(A), which corresponds in functionality to the active TLB metadata pointer 152 of FIG. 1. The active pointer table entries 220(0)-220(A) are each associated with a translation regime, and stores the active TLB metadata pointer 222(0)-222(A) to be included in the TLB tags 142(0)-142(B) of the TLB entries 140(0)-140(A) corresponding to that translation regime. Thus, for example, the active pointer table entry 220(0) may be associated with the translation regime EL1&0 such that the active TLB metadata pointer 222(0) is stored as part of the TLB tags 142(0)-142(B) of the TLB entries 140(0)-140(B) corresponding to the translation regime EL1&0. The active pointer table entries 220(0)-220(A) may also store respective global active TLB metadata pointers 224(0)-224(A) that may be used to point to TLB metadata buffer entries 202(0)-202(T) for which the corresponding global indicators 208(0)-208(T) are set.

In exemplary operation, the MMU 132 of FIG. 2 detects a processor context switch to a new context 226 that associated with an ASID 228 and a VMID 230. To ensure that there are TLB metadata buffer entries 202(0)-202(T) available for use in the new context 226, the MMU 132 may invalidate one or more least-recently-used TLB metadata buffer entries of the TLB metadata buffer entries 202(0)-202(T) of the TLB metadata buffer 200. The MMU 132 may then determine whether there exists one or more TLB metadata buffer entries 202(0)-202(T) that store TLB metadata 210(0)-210(T) comprising the ASID 228 and the VMID 230 of the new context 226, or that store the VMID 230 of the new context 226 and have corresponding global indicators 208(0)-208(T) set. If not, the MMU 132 allocates a TLB metadata buffer entry such as the TLB metadata buffer entry 202(0), stores the ASID 228 and the VMID 230 of the new context 226 as the ASID 212(0) and the VMID 214(0) of the TLB metadata 210(0) of the TLB metadata buffer entry 202(0), and, in some aspects, sets the global indicator 208(0) appropriately.

Upon identifying a TLB metadata buffer entry such as the TLB metadata buffer entry 202(0) that stores corresponding TLB metadata 210(0) comprising the ASID 228 and the VMID 230 of the new context 226 (or that stores corresponding TLB metadata 210(0) comprising the VMID 230 of the new context 226 and has the global indicator 208(0) set), the MMU 132 selects the TLB metadata buffer entry 202(0) for use in accessing the TLB 134 of FIG. 1. The MMU 132 then stores a pointer to the TLB metadata buffer entry 202(0) in an active pointer table entry, such as the active pointer table entry 220(0), that corresponds to a translation regime indicated by the translation regime indicator 216(0) of the TLB metadata buffer entry 202(0). Thus, in the example of FIG. 2, if the translation regime indicator 216(0) indicates that the TLB metadata buffer entry 202(0) corresponds to the translation regime EL1&0 represented by the active pointer table entry 220(0), the MMU 132 stores a pointer to the TLB metadata buffer entry 202(0) as the active TLB metadata pointer 222(0) of the active pointer table entry 220(0). When the MMU 132 subsequently generates a TLB entry such as the TLB entry 140(0) in the TLB 134 for a memory access request made during the new context 226 under the translation regime EL1&0, the MMU 132 retrieves the active TLB metadata pointer 222(0) from the active pointer table entry 220(0) corresponding to the translation regime EL1&0, and stores it as part of the TLB tag 142(0) of the TLB entry 140(0) in lieu of the ASID 228 and the VMID 230. In some aspects, if the global indicator 208(0) of the TLB metadata buffer entry 202(0) is set, the MMU 132 stores the pointer to the TLB metadata buffer entry 202(0) as the global active TLB metadata pointer 224(0) of the active pointer table entry 220(0).

Figure 3:
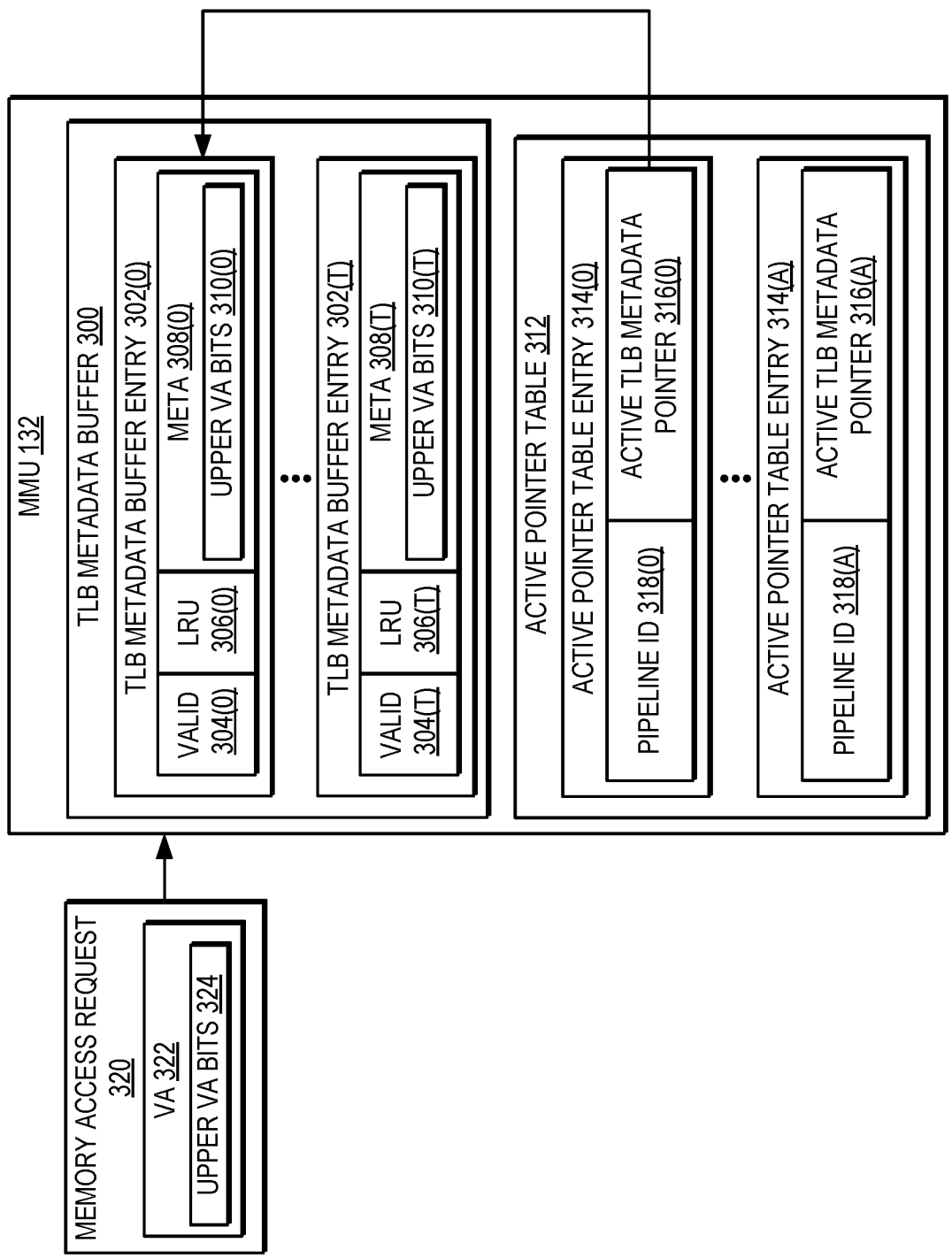
FIG. 3 is a block diagram of an exemplary aspect of the MMU of FIG. 1 in which the TLB metadata buffer stores TLB metadata comprising upper bits of virtual addresses (VAs) for multiple processor pipelines, according to some aspects.

To compress the size of TLB tags while providing the upper bits of VAs for memory pages being accessed by the processor pipelines 106(0)-106(P) of FIG. 1, some aspects of the MMU 132 of FIG. 1 provide support for storing TLB metadata that includes an implementation-specific number of upper bits of the VAs. In this regard, FIG. 3 illustrates an exemplary aspect of the MMU 132 of FIG. 1 that provides a TLB metadata buffer 300 that corresponds in functionality to the TLB metadata buffer 146 of FIG. 1. The TLB metadata buffer 300 of FIG. 3 stores a plurality of TLB metadata buffer entries 302(0)-302(T) that correspond in functionality to the TLB metadata buffer entries 148(0)-148(T) of FIG. 1. The TLB metadata buffer entries 302(0)-302(T) in the example of FIG. 3 include respective validity indicators (captioned as "VALID" in FIG. 3) 304(0)-304(T) and respective LRU data (captioned as "LRU" in FIG. 3) 306(0)-306(T). The TLB metadata buffer entries 302(0)-302(T) also include respective TLB metadata (captioned as "META" in FIG. 3) 308(0)-308(T), each of which comprises a plurality of upper VA bits 310(0)-310(T) of a VA of a memory page.

The MMU 132 of FIG. 3 further provides an active pointer table 312 that stores a plurality of active pointer table entries 314(0)-314(A), each of which stores a respective active TLB metadata pointer 316(0)-316(A), which corresponds in functionality to the active TLB metadata pointer 152 of FIG. 1. The active pointer table entries 314(0)-314(A) also store corresponding pipeline identifiers (captioned as "PIPELINE ID" in FIG. 3) 318(0)-318(A) that each identify a processor pipeline among the processor pipelines 106(0)-106(P) with which the respective active pointer table entry 314(0)-314(A) is associated.

In exemplary operation, the MMU 132 of FIG. 3 receives a memory access request 320 that comprises a VA 322 having a plurality of upper VA bits 324, and that is associated with a processor pipeline, such as the processor pipeline 106(0), of the processor pipelines 106(0)-106(P) of the processor-based device 100. The MMU 132 may determine that whether there exists a TLB metadata buffer entry 302(0)-302(T) that stores corresponding TLB metadata 308(0)-308(T) comprising the plurality of upper bits 324 of the VA 322. If not, the MMU 132 may allocate a TLB metadata buffer entry such as the TLB metadata buffer entry 302(0), and stores the plurality of upper bits 324 of the VA 322 as the TLB metadata 308(0) of the TLB metadata buffer entry 302(0).

After locating the TLB metadata buffer entry 302(0) storing the corresponding TLB metadata 308(0) comprising the plurality of upper bits 324 of the VA 322, the MMU 132 selects the TLB metadata buffer entry 302(0) for use in accessing the TLB 134 of FIG. 1. The MMU 132 then stores the pointer to the TLB metadata buffer entry 302(0) as, e.g., the active TLB metadata pointer 316(0) of the active pointer table entry 314(0), and also stores an identifier of the processor pipeline 106(0) as the pipeline identifier 318(0) of the active pointer table entry 314(0). When the MMU 132 subsequently generates a TLB entry such as the TLB entry 140(0) in the TLB 134 for a memory access request to the VA 322 in the processor pipeline 106(0), the MMU 132 retrieves the active TLB metadata pointer 316(0) from the active pointer table entry 314(0) corresponding to the processor pipeline 106(0), and stores it as part of the TLB tag 142(0) of the TLB entry 140(0) in lieu of the full VA 322.

Figure 4:
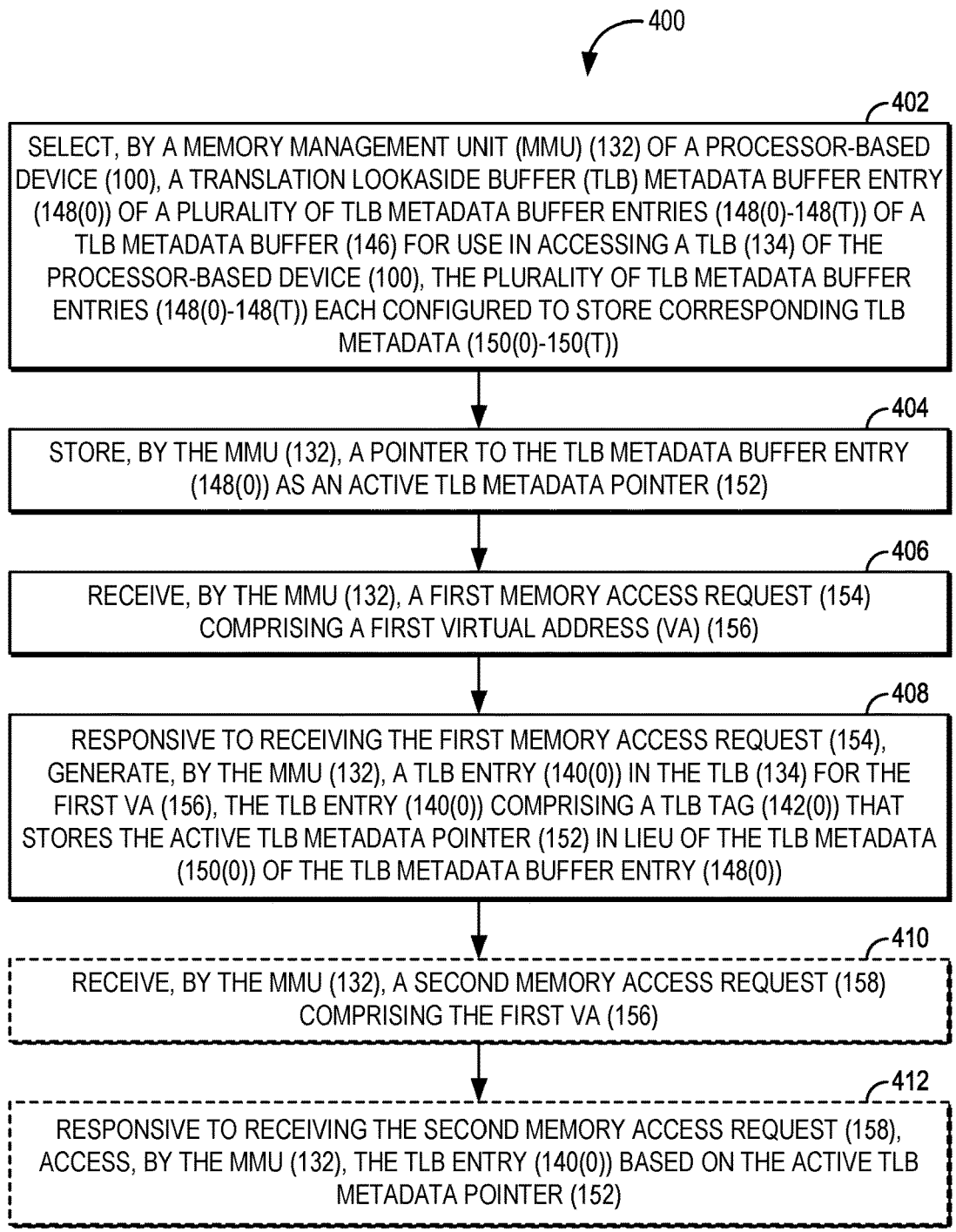
FIG. 4 provides a flowchart illustrating exemplary operations of the MMU and the TLB of FIGS. 1-3 for compressing TLB tags using a TLB metadata buffer, according to some aspects.

To illustrate exemplary operations of the MMU 132 and the TLB 134 of FIG. 1 for compressing TLB tags using the TLB metadata buffer 146 according to some aspects, FIG. 4 provides a flowchart illustrating exemplary operations 400. For the sake of clarity, elements of FIG. 1 are referenced in describing FIG. 4. The operations 400 begin with the MMU 132 of the processor-based device 100 selecting a TLB metadata buffer entry (e.g., the TLB metadata buffer entry 148(0) of FIG. 1) of a plurality of TLB metadata buffer entries (such as the TLB metadata buffer entries 148(0)-148(T) of FIG. 1) of a TLB metadata buffer (e.g., the TLB metadata buffer 146 of FIG. 1) for use in accessing a TLB (such as the TLB 134 of FIG. 1) of the processor-based device 100, the plurality of TLB metadata buffer entries 148(0)-148(T) each configured to store corresponding TLB metadata (e.g., the TLB metadata 150(0)-150(T) of FIG. 1) (block 402). The MMU 132 stores a pointer to the TLB metadata buffer entry 148(0) as an active TLB metadata pointer (such as the active TLB metadata pointer 152 of FIG. 1) (block 404).

The MMU 132 subsequently receives a first memory access request (e.g., the memory access request 154 of FIG. 1) comprising a first VA (such as the VA 156 of FIG. 1) (block 406). In response to receiving the first memory access request 154, the MMU 132 generates a TLB entry (e.g., the TLB entry 140(0) of FIG. 1) in the TLB 134 for the first VA 156, the TLB entry 140(0) comprising a TLB tag (such as the TLB tag 142(0) of FIG. 1) that stores the active TLB metadata pointer 152 in lieu of the TLB metadata 150(0) of the TLB metadata buffer entry 148(0) (block 408). In some aspects, the MMU 132 receives a second memory access request (e.g., the memory access request 158 of FIG. 1) comprising the first VA 156 (block 410). Responsive to receiving the second memory access request 158, the MMU 132 accesses the TLB entry 140(0) based on the active TLB metadata pointer 152 (e.g., by using the active TLB metadata pointer 152 to match the TLB tag 142(0) of the TLB entry 140(0)) (block 412).

Figure 5A:
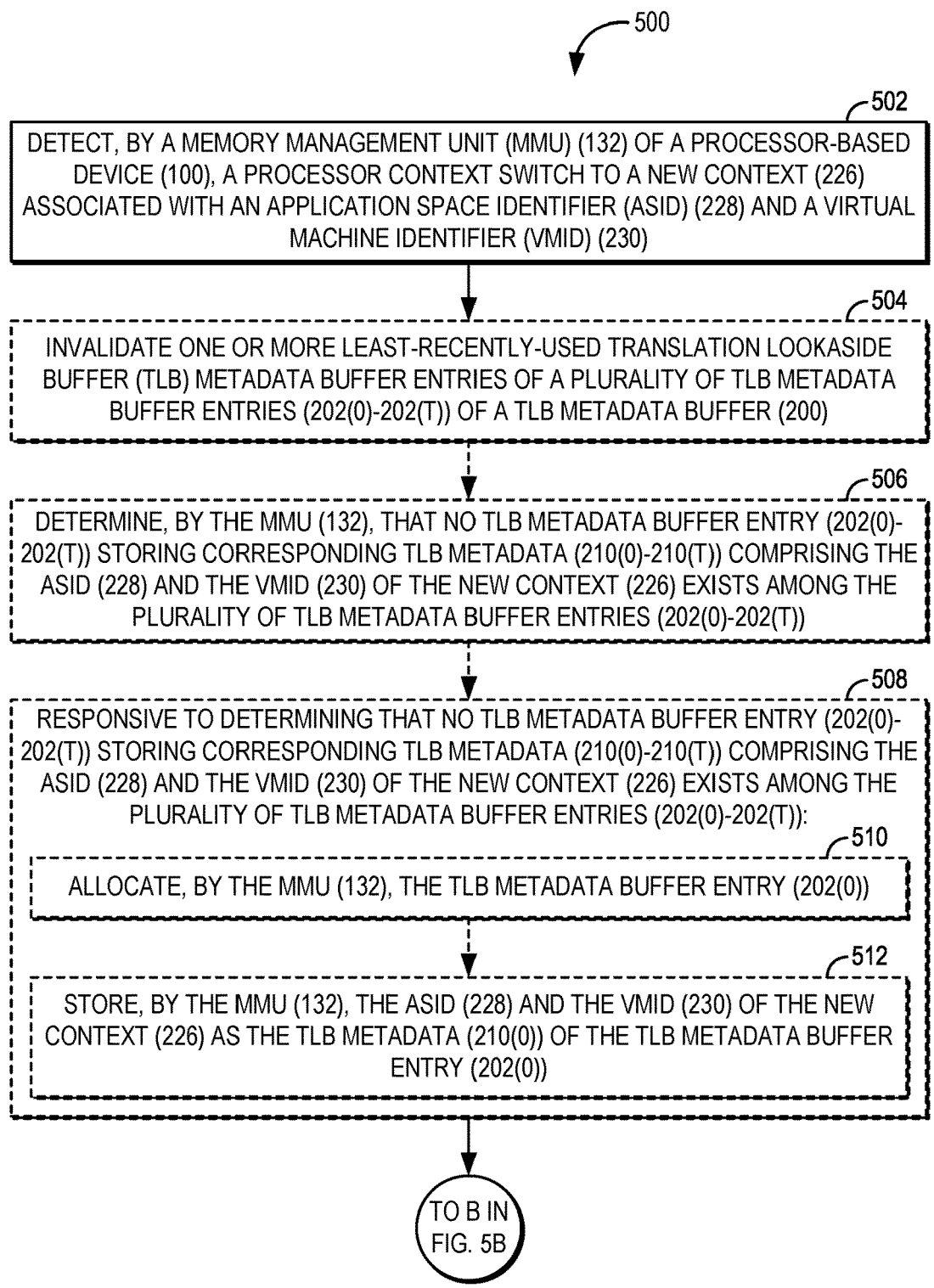
FIGS. 5A-5B provide a flowchart illustrating exemplary operations of the MMU and the TLB of FIGS. 1 and 2 for storing TLB metadata comprising ASIDs and VMIDs for multiple translation regimes in response to processor context switches, according to some aspects.
Figure 5B:
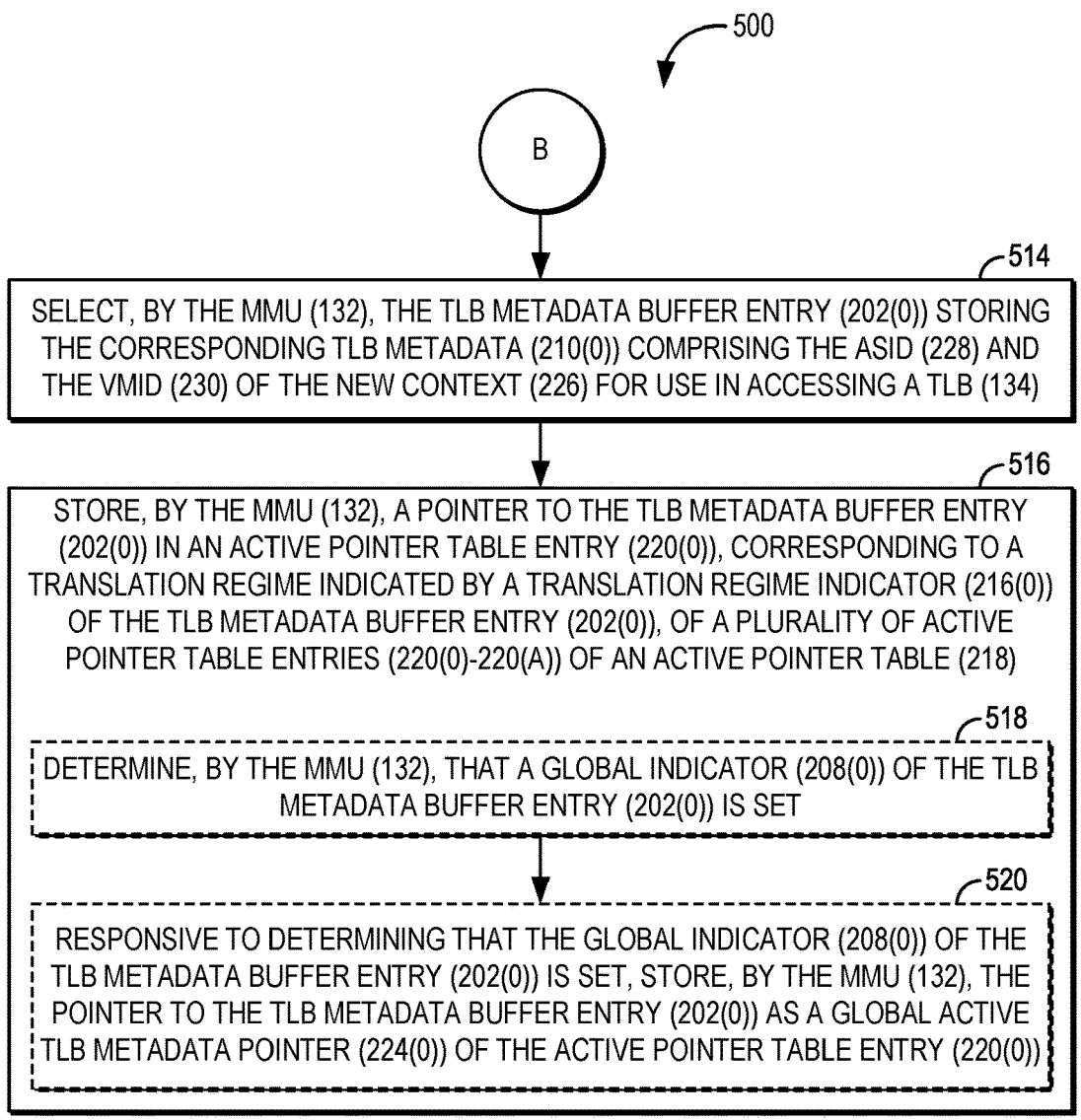

FIGS. 5A-5B provide a flowchart illustrating exemplary operations 500 of the MMU 132 of FIGS. 1 and 2 for storing TLB metadata comprising ASIDs and VMIDs for multiple translation regimes in response to processor context switches, according to some aspects. Elements of FIGS. 1 and 2 are referenced in describing FIGS. 5A and 5B for the sake of clarity. It is to be understood that some of the operations 500 illustrated in FIGS. 5A and 5B correspond to operations described above with respect to FIG. 4. In FIG. 5A, the operations 500 begin with the MMU 132 detecting a processor context switch to a new context (e.g., the context 226 of FIG. 2) associated with an ASID (such as the ASID 228 of FIG. 2) and a VMID (e.g., the VMID 230 of FIG. 2) (block 502). In some aspects, the MMU 132 may invalidate one or more least-recently-used TLB metadata buffer entries of a plurality of TLB metadata buffer entries (e.g., the TLB metadata buffer entries 202(0)-202(T) of FIG. 2) of a TLB metadata buffer (such as the TLB metadata buffer 200 of FIG. 2) (block 504). In this manner, the MMU 132 may preemptively ensure that at least the one or more least-recently-used TLB metadata buffer entries will be available for use within the new context 226.

Some aspects may provide that the MMU 132 determines that that no TLB metadata buffer entry 202(0)-202(T) storing corresponding TLB metadata (e.g., the TLB metadata 210(0)-210(T) of FIG. 2) comprising the ASID 228 and the VMID 230 of the new context 226 exists among the plurality of TLB metadata buffer entries 202(0)-202(T) (block 506). In response to determining that no TLB metadata buffer entry 202(0)-202(T) storing corresponding TLB metadata 210(0)-210(T) comprising the ASID 228 and the VMID 230 of the new context 226 exists among the plurality of TLB metadata buffer entries 202(0)-202(T), the MMU 132 performs a series of operations (block 508). The MMU 132 first allocates a TLB metadata buffer entry (e.g., the TLB metadata buffer entry 202(0) of FIG. 2) (block 510). The MMU 132 then stores the ASID 228 and the VMID 230 of the new context 226 as the TLB metadata 210(0) of the TLB metadata buffer entry 202(0) (block 512). The operations 500 then continue at block 514 of FIG. 5B.

Turning now to FIG. 5B, the MMU 132 selects the TLB metadata buffer entry 202(0) storing the corresponding TLB metadata 210(0) comprising the ASID 228 and the VMID 230 of the new context 226 for use in accessing the TLB 134 (block 514). The operations of block 502 for detecting the processor context switch to the new context 226 and the operations of block 514 for selecting the TLB metadata buffer entry 202(0) storing the corresponding TLB metadata 210(0) comprising the ASID 228 and the VMID 230 of the new context 226 thus correspond to the operations of block 402 of FIG. 4 in some aspects. The MMU 132 then stores a pointer to the TLB metadata buffer entry 202(0) in an active pointer table entry (such as the active pointer table entry 220(0) of FIG. 2), corresponding to a translation regime indicated by a translation regime indicator (e.g., the translation regime indicator 216(0) of FIG. 2) of the TLB metadata buffer entry 202(0), of the plurality of active pointer table entries 220(0)-220(A) of the active pointer table 218 (block 516). The operations of block 516 for storing the pointer to the TLB metadata buffer entry 202(0) in the active pointer table entry 220(0) corresponding to a translation regime indicated by the translation regime indicator 216(0) of the TLB metadata buffer entry 202(0) thus corresponds to the operations of block 404 of FIG. 4 in some aspects.

In some aspects, the operations of block 516 for storing the pointer to the TLB metadata buffer entry 202(0) in the active pointer table entry 220(0) corresponding to a translation regime indicated by the translation regime indicator 216(0) of the TLB metadata buffer entry 202(0) may comprise the MMU 132 determining that a global indicator (e.g., the global indicator 208(0) of FIG. 2) of the TLB metadata buffer entry 202(0) is set (block 518). Responsive to determining that the global indicator 208(0) of the TLB metadata buffer entry 202(0) is set, the MMU 132 stores the pointer to the TLB metadata buffer entry 202(0) as a global active TLB metadata pointer (e.g., the global active TLB metadata pointer 224(0) of FIG. 2) of the active pointer table entry 220(0) (block 520).

Figure 6:
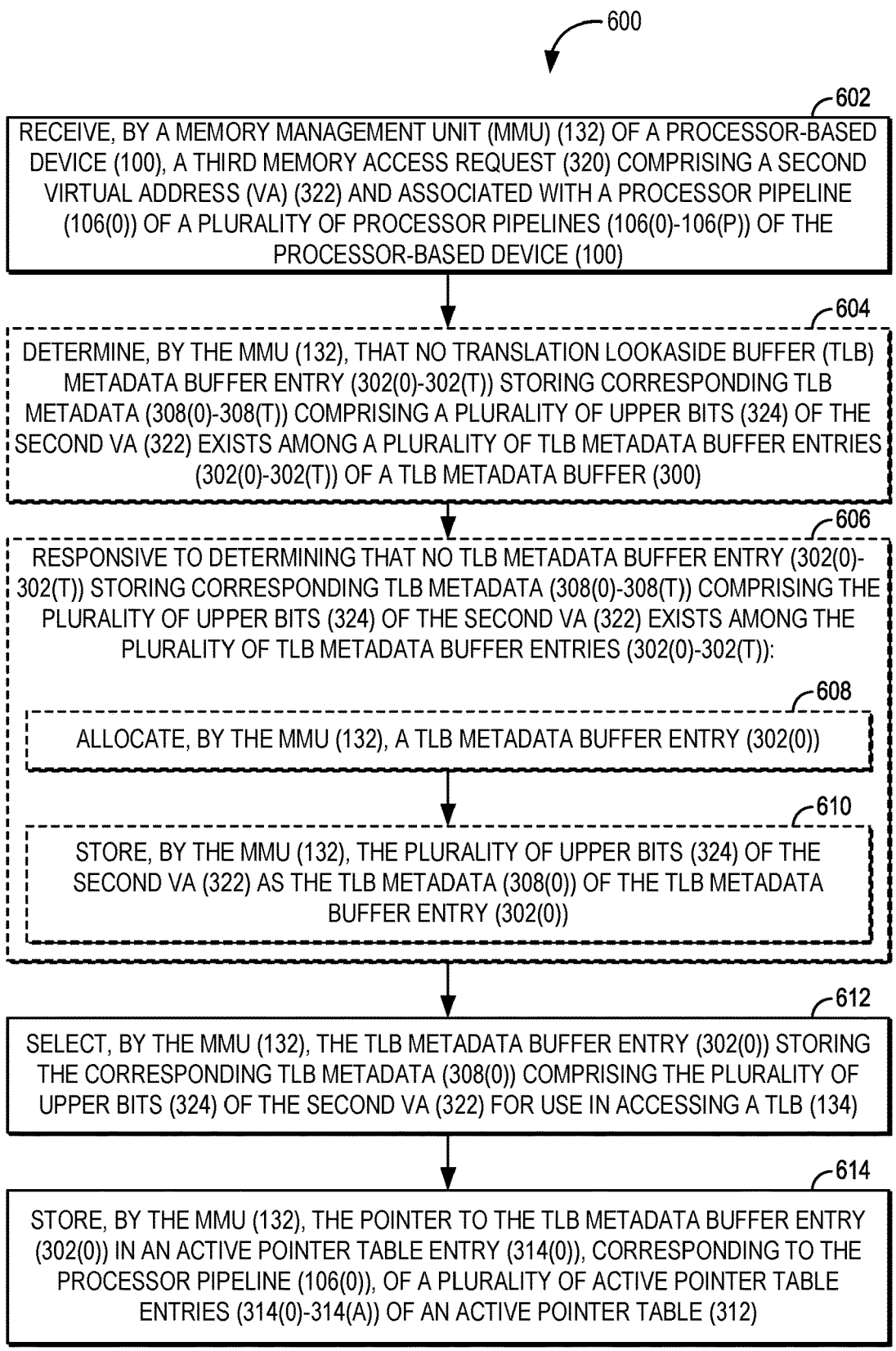
FIG. 6 provides a flowchart illustrating exemplary operations of the MMU and the TLB of FIGS. 1 and 3 for storing TLB metadata comprising upper bits of VAs for multiple processor pipelines, according to some aspects.

To illustrate exemplary operations of the MMU 132 of FIGS. 1 and 3 for storing TLB metadata comprising the upper bits of VAs for multiple processor pipelines according to some aspects, FIG. 6 provides a flowchart illustrating exemplary operations 600. For the sake of clarity, elements of FIGS. 1 and 3 are referenced in describing FIG. 6. It is to be understood that some of the operations 600 illustrated in FIG. 6 correspond to operations described above with respect to FIG. 4. The operations 600 in FIG. 6 with the MMU 132 receiving a third memory access request (e.g., the memory access request 320 of FIG. 3) comprising a second VA (e.g., the VA 322 of FIG. 3) and associated with a processor pipeline (e.g., the processor pipeline 106(0) of FIG. 1) of a plurality of processor pipelines (such as the processor pipelines 106(0)-106(P) of FIG. 1) of the processor-based device 100 (block 602). According to some aspects, the MMU 132 may determine that no TLB metadata buffer entry (such as TLB metadata buffer entries 302(0)-302(T) of FIG. 3) storing corresponding TLB metadata (such as the TLB metadata 308(0)-308(T) of FIG. 3) comprising the plurality of upper bits (e.g., the upper bits 324 of FIG. 3) of the second VA 322 exists among a plurality of TLB metadata buffer entries 302(0)-302(T) of a TLB metadata buffer (e.g., the TLB metadata buffer 300 of FIG. 3) (block 604). In response to determining that no TLB metadata buffer entry 302(0)-302(T) storing corresponding TLB metadata 308(0)-308(T) comprising the plurality of upper bits 324 of the second VA 322 exists among the plurality of TLB metadata buffer entries 302(0)-302(T), the MMU 132 performs a series of operations (block 606). The MMU 132 first allocates a TLB metadata buffer entry (e.g., the TLB metadata buffer entry 302(0) of FIG. 3) (block 608). The MMU 132 then stores the plurality of upper bits 324 of the second VA 322 as the TLB metadata 308(0) of the TLB metadata buffer entry 302(0) (block 610).

The MMU 132 selects the TLB metadata buffer entry 302(0) storing the corresponding TLB metadata 308(0) comprising the plurality of upper bits 324 of the second VA 322 for use in accessing a TLB (such as the TLB 134 of FIG. 1) (block 612). The operations of block 612 for selecting the TLB metadata buffer entry 302(0) storing the corresponding TLB metadata 308(0) comprising the plurality of upper bits 324 of the second VA 322 thus correspond to the operations of block 402 of FIG. 4 in some aspects. The MMU 132 then stores the pointer to the TLB metadata buffer entry 302(0) in an active pointer table entry (e.g., the active pointer table entry 314(0) of FIG. 3), corresponding to the processor pipeline 106(0), of a plurality of active pointer table entries (such as the active pointer table entries 314(0)-314(A) of FIG. 3) of an active pointer table (e.g., the active pointer table 312 of FIG. 3) (block 614). The operations of block 614 for storing the pointer to the TLB metadata buffer entry 302(0) in the active pointer table entry 314(0) corresponding to the processor pipeline 106(0) thus corresponds to the operations of block 404 of FIG. 4 in some aspects.

The MMU and the TLB according to aspects disclosed herein and discussed with reference to FIGS. 1-4, 5A-5B, and 6 may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, laptop computer, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, an avionics system, a drone, and a multicopter.

Figure 7:
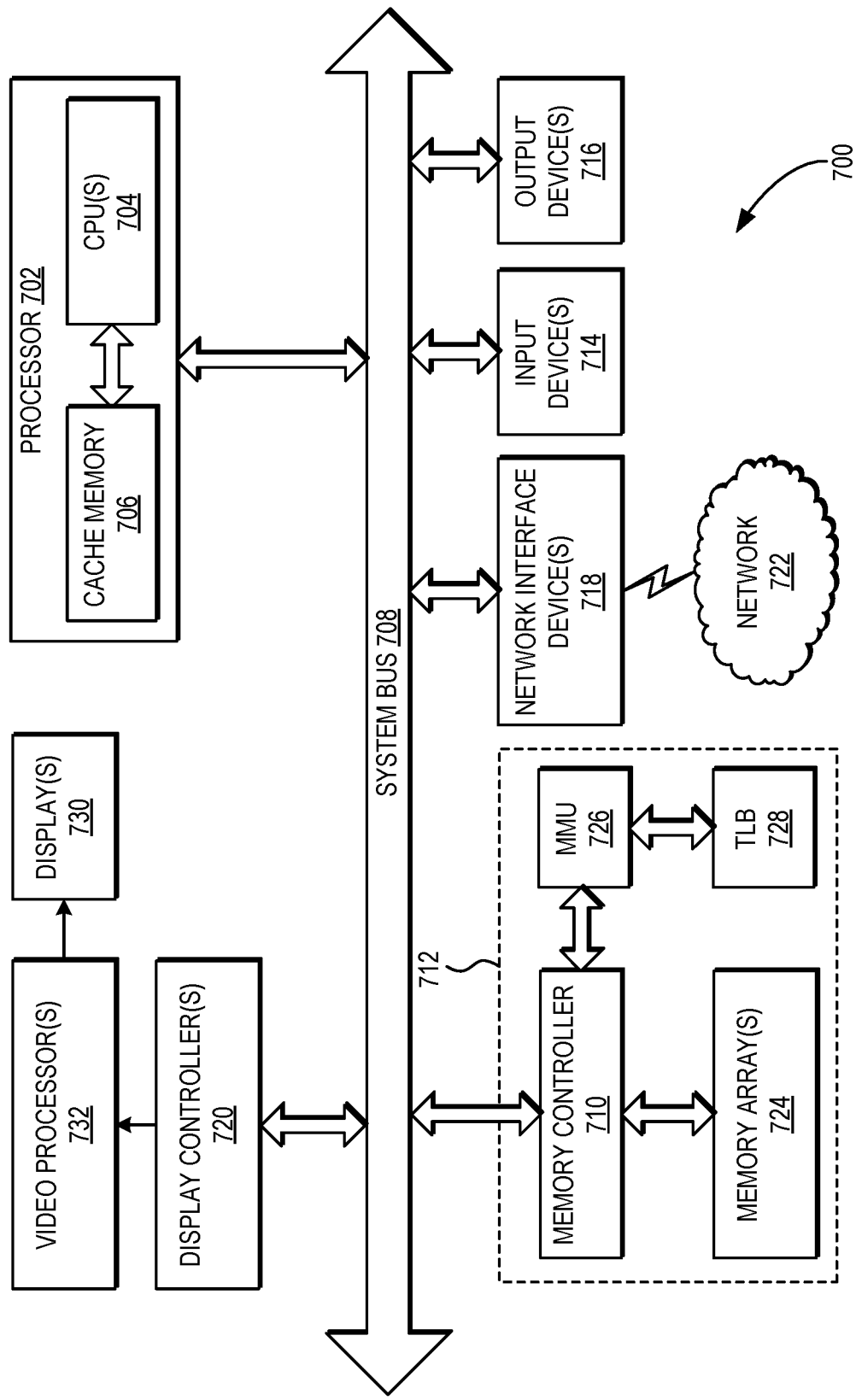
FIG. 7 is a block diagram of an exemplary processor-based device that can include the MMU and the TLB of FIGS. 1 and 2.

In this regard, FIG. 7 illustrates an example of a processor-based device 700 that includes an MMU and a TLB as illustrated and described with respect to FIGS. 1-4, 5A-5B, and 6. In this example, the processor-based device 700, which corresponds in functionality to the processor-based device 100 of FIG. 1, includes a processor 702 which comprises one or more CPUs 704 coupled to a cache memory 706. The CPU(s) 704 is also coupled to a system bus 708 and can intercouple devices included in the processor-based device 700. As is well known, the CPU(s) 704 communicates with these other devices by exchanging address, control, and data information over the system bus 708. For example, the CPU(s) 704 can communicate bus transaction requests to a memory controller 710. Although not illustrated in FIG. 7, multiple system buses 708 could be provided, wherein each system bus 708 constitutes a different fabric.

Other devices may be connected to the system bus 708. As illustrated in FIG. 7, these devices can include a memory system 712, one or more input devices 714, one or more output devices 716, one or more network interface devices 718, and one or more display controllers 720, as examples. The input device(s) 714 can include any type of input device, including, but not limited to, input keys, switches, voice processors, etc. The output device(s) 716 can include any type of output device, including, but not limited to, audio, video, other visual indicators, etc. The network interface device(s) 718 can be any devices configured to allow exchange of data to and from a network 722. The network 722 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 718 can be configured to support any type of communications protocol desired. The memory system 712 can include the memory controller 710 coupled to one or more memory arrays 724 and an MMU 726 (such as, e.g., the MMU 132 of FIGS. 1-3), which may be coupled to a TLB 728 (e.g., the TLB 134 of FIG. 1).

The CPU(s) 704 may also be configured to access the display controller(s) 720 over the system bus 708 to control information sent to one or more displays 730. The display controller(s) 720 sends information to the display(s) 730 to be displayed via one or more video processors 732, which process the information to be displayed into a format suitable for the display(s) 730. The display(s) 730 can include any type of display, including, but not limited to, a cathode ray tube (CRT), a liquid crystal display (LCD), a plasma display, a light emitting diode (LED) display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master devices and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

Implementation examples are described in the following numbered clauses:

1. A processor-based device, comprising:
   a translation lookaside buffer (TLB) comprising a plurality of TLB entries;
   a TLB metadata buffer comprising a plurality of TLB metadata buffer entries each configured to store corresponding TLB metadata; and
   a memory management unit (MMU) configured to:
      select a TLB metadata buffer entry among the plurality of TLB metadata buffer entries for use in accessing the TLB;
      store a pointer to the TLB metadata buffer entry as an active TLB metadata pointer;
      receive a first memory access request comprising a first virtual address (VA); and
      responsive to receiving the first memory access request, generate a TLB entry in the TLB for the first VA, the TLB entry comprising a TLB tag that stores the active TLB metadata pointer in lieu of the TLB metadata of the TLB metadata buffer entry.

2. The processor-based device of clause 1, wherein the MMU is further configured to:
   receive a second memory access request comprising the first VA; and
   responsive to receiving the second memory access request, access the TLB entry based on the active TLB metadata pointer.

3. The processor-based device of any one of clauses 1-2, wherein:
   each TLB metadata buffer entry of the plurality of TLB metadata buffer entries is configured to store the corresponding TLB metadata comprising an Application Space Identifier (ASID) and a Virtual Machine Identifier (VMID) of a processor context; and
   the MMU is configured to select the TLB metadata buffer entry among the plurality of TLB metadata buffer entries for use in accessing the TLB by being configured to:
      detect a processor context switch to a new context associated with an ASID and a VMID; and
      select the TLB metadata buffer entry storing the corresponding TLB metadata comprising the ASID and the VMID of the new context for use in accessing the TLB.

4. The processor-based device of clause 3, wherein the MMU is further configured to, prior to selecting the TLB metadata buffer entry storing the ASID and the VMID of the new context as the corresponding TLB metadata for use in accessing the TLB:
   determine that no TLB metadata buffer entry storing corresponding TLB metadata comprising the ASID and the VMID of the new context exists among the plurality of TLB metadata buffer entries; and
   responsive to determining that no TLB metadata buffer entry storing corresponding TLB metadata comprising the ASID and the VMID of the new context exists among the plurality of TLB metadata buffer entries:
      allocate the TLB metadata buffer entry; and
      store the ASID and the VMID of the new context as the TLB metadata of the TLB metadata buffer entry.

5. The processor-based device of any one of clauses 3-4, wherein:
- the MMU further comprises an active pointer table comprising a plurality of active pointer table entries each associating an active TLB metadata pointer with a corresponding translation regime;
- each TLB metadata buffer entry of the plurality of TLB metadata buffer entries is configured to store the corresponding TLB metadata further comprising a translation regime indicator; and
- the MMU is configured to store the pointer to the TLB metadata buffer entry as the active TLB metadata pointer by being configured to store the pointer to the TLB metadata buffer entry in an active pointer table entry, corresponding to a translation regime indicated by the translation regime indicator of the TLB metadata buffer entry, of the plurality of active pointer table entries of the active pointer table.

6. The processor-based device of clause 5, wherein:
- each TLB metadata buffer entry of the plurality of TLB metadata buffer entries is configured to store the corresponding TLB metadata further comprising a global indicator;
- each active pointer table entry of the plurality of active pointer table entries further comprises a global active TLB metadata pointer; and
- the MMU is configured to store the pointer to the TLB metadata buffer entry in the active pointer table entry corresponding to the translation regime indicated by the translation regime indicator of the TLB metadata buffer entry by being configured to:
  - determine that the global indicator of the TLB metadata buffer entry is set; and
  - responsive to determining that the global indicator of the TLB metadata buffer entry is set, store the pointer to the TLB metadata buffer entry as the global active TLB metadata pointer of the active pointer table entry.

7. The processor-based device of any one of clauses 3-6, wherein the MMU is further configured to, subsequent to detecting the processor context switch to the new context associated with the ASID and the VMID, invalidate one or more least-recently-used TLB metadata buffer entries of the plurality of TLB metadata buffer entries.

8. The processor-based device of any one of clauses 1-2, wherein:
- each TLB metadata buffer entry of the plurality of TLB metadata buffer entries is configured to store the corresponding TLB metadata comprising a plurality of upper bits of a VA;
- the MMU further comprises an active pointer table comprising a plurality of active pointer table entries each associating an active TLB metadata pointer with a corresponding processor pipeline of a plurality of processor pipelines;
- the MMU is configured to select the TLB metadata buffer entry among the plurality of TLB metadata buffer entries for use in accessing the TLB by being configured to:
  - receive a third memory access request comprising a second VA and associated with a processor pipeline of a plurality of processor pipelines of the processor-based device; and
  - select the TLB metadata buffer entry storing the corresponding TLB metadata comprising a plurality of upper bits of the second VA for use in accessing the TLB; and
- the MMU is configured to store the pointer to the TLB metadata buffer entry as the active TLB metadata pointer by being configured to store the pointer to the TLB metadata buffer entry in an active pointer table entry, corresponding to the processor pipeline, of the plurality of active pointer table entries of the active pointer table.

9. The processor-based device of clause 8, wherein the MMU is further configured to, prior to selecting the TLB metadata buffer entry storing the corresponding TLB metadata comprising the plurality of upper bits of the second VA for use in accessing the TLB:
- determine that no TLB metadata buffer entry storing corresponding TLB metadata comprising the plurality of upper bits of the second VA exists among the plurality of TLB metadata buffer entries; and
- responsive to determining that no TLB metadata buffer entry storing corresponding TLB metadata comprising the plurality of upper bits of the second VA exists among the plurality of TLB metadata buffer entries:
  - allocate the TLB metadata buffer entry; and
  - store the plurality of upper bits of the second VA as the TLB metadata of the TLB metadata buffer entry.

10. The processor-based device of any one of clauses 1-9, integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

11. A processor-based device, comprising:
- means for selecting a translation lookaside buffer (TLB) metadata buffer entry of a plurality of TLB metadata buffer entries of a TLB metadata buffer for use in accessing a TLB of the processor-based device, the plurality of TLB metadata buffer entries each configured to store corresponding TLB metadata;
- means for storing a pointer to the TLB metadata buffer entry as an active TLB metadata pointer;
- means for receiving a first memory access request comprising a first virtual address (VA); and
- means for generating a TLB entry in the TLB for the first VA, the TLB entry comprising a TLB tag that stores the active TLB metadata pointer in lieu of the TLB metadata of the TLB metadata buffer entry, responsive to receiving the first memory access request.

12. A method for compressing translation lookaside buffer (TLB) tags using a TLB metadata buffer, comprising:
- selecting, by a memory management unit (MMU) of a processor-based device, a TLB metadata buffer entry of a plurality of TLB metadata buffer entries of a TLB metadata buffer for use in accessing a TLB of the processor-based device, the plurality of TLB metadata buffer entries each configured to store corresponding TLB metadata;
- storing, by the MMU, a pointer to the TLB metadata buffer entry as an active TLB metadata pointer;

receiving, by the MMU, a first memory access request comprising a first virtual address (VA); and responsive to receiving the first memory access request, generating, by the MMU, a TLB entry in the TLB for the first VA, the TLB entry comprising a TLB tag that stores the active TLB metadata pointer in lieu of the TLB metadata of the TLB metadata buffer entry.

13. The method of clause 12, further comprising:

receiving, by the MMU, a second memory access request comprising the first VA; and responsive to receiving the second memory access request, accessing, by the MMU, the TLB entry based on the active TLB metadata pointer.

14. The method of any one of clauses 12-13, wherein:

each TLB metadata buffer entry of the plurality of TLB metadata buffer entries is configured to store the corresponding TLB metadata comprising an Application Space Identifier (ASID) and a Virtual Machine Identifier (VMID) of a processor context; and selecting the TLB metadata buffer entry among the plurality of TLB metadata buffer entries for use in accessing the TLB comprises:

detecting, by the MMU, a processor context switch to a new context associated with an ASID and a VMID; and selecting, by the MMU, the TLB metadata buffer entry storing the corresponding TLB metadata comprising the ASID and the VMID of the new context for use in accessing the TLB.

15. The method of clause 14, further comprising, prior to selecting the TLB metadata buffer entry storing the ASID and the VMID of the new context as the corresponding TLB metadata for use in accessing the TLB:

determining, by the MMU, that no TLB metadata buffer entry storing corresponding TLB metadata comprising the ASID and the VMID of the new context exists among the plurality of TLB metadata buffer entries;

and responsive to determining that no TLB metadata buffer entry storing corresponding TLB metadata comprising the ASID and the VMID of the new context exists among the plurality of TLB metadata buffer entries:

allocating, by the MMU, the TLB metadata buffer entry; and storing, by the MMU, the ASID and the VMID of the new context as the TLB metadata of the TLB metadata buffer entry.

16. The method of any one of clauses 14-15, wherein:

the MMU further comprises an active pointer table comprising a plurality of active pointer table entries each associating an active TLB metadata pointer with a corresponding translation regime;

each TLB metadata buffer entry of the plurality of TLB metadata buffer entries is configured to store the corresponding TLB metadata further comprising a translation regime indicator; and storing the pointer to the TLB metadata buffer entry as the active TLB metadata pointer comprises storing, by the MMU, the pointer to the TLB metadata buffer entry in an active pointer table entry, corresponding to a translation regime indicated by the translation regime indicator of the TLB metadata buffer entry, of the plurality of active pointer table entries of the active pointer table.

17. The method of clause 16, wherein:

each TLB metadata buffer entry of the plurality of TLB metadata buffer entries is configured to store the corresponding TLB metadata further corresponding to a global indicator;

each active pointer table entry of the plurality of active pointer table entries further comprises a global active TLB metadata pointer; and storing the pointer to the TLB metadata buffer entry in the active pointer table entry corresponding to the translation regime indicated by the translation regime indicator of the TLB metadata buffer entry comprises:

determining, by the MMU, that the global indicator of the TLB metadata buffer entry is set; and responsive to determining that the global indicator of the TLB metadata buffer entry is set, storing, by the MMU, the pointer to the TLB metadata buffer entry as the global active TLB metadata pointer of the active pointer table entry.

18. The method of any one of clauses 12-13, wherein:

each TLB metadata buffer entry of the plurality of TLB metadata buffer entries is configured to store the corresponding TLB metadata comprising a plurality of upper bits of a VA;

the MMU further comprises an active pointer table comprising a plurality of active pointer table entries each associating an active TLB metadata pointer with a corresponding processor pipeline of a plurality of processor pipelines;

selecting the TLB metadata buffer entry among the plurality of TLB metadata buffer entries for use in accessing the TLB comprises:

receiving, by the MMU, a third memory access request comprising a second VA and associated with a processor pipeline of a plurality of processor pipelines of the processor-based device; and selecting, by the MMU, the TLB metadata buffer entry storing the corresponding TLB metadata comprising a plurality of upper bits of the second VA for use in accessing the TLB; and storing the pointer to the TLB metadata buffer entry as the active TLB metadata pointer comprises storing, by the MMU, the pointer to the TLB metadata buffer entry in an active pointer table entry, corresponding to the processor pipeline, of the plurality of active pointer table entries of the active pointer table.

19. The method of clause 18, further comprising, prior to selecting the TLB metadata buffer entry storing the corresponding TLB metadata comprising the plurality of upper bits of the second VA for use in accessing the TLB:

determining, by the MMU, that no TLB metadata buffer entry storing corresponding TLB metadata comprising the plurality of upper bits of the second VA exists among the plurality of TLB metadata buffer entries; and responsive to determining that no TLB metadata buffer entry storing corresponding TLB metadata comprising the plurality of upper bits of the second VA exists among the plurality of TLB metadata buffer entries:

allocating, by the MMU, the TLB metadata buffer entry; and storing, by the MMU, the plurality of upper bits of the second VA as the TLB metadata of the TLB metadata buffer entry.

20. A non-transitory computer-readable medium, having stored thereon computer-executable instructions that, when executed, cause a processor of a processor-based device to:

select a translation lookaside buffer (TLB) metadata buffer entry of a plurality of TLB metadata buffer entries of a TLB metadata buffer for use in accessing a TLB of the processor-based device, the plurality of TLB metadata buffer entries each configured to store corresponding TLB metadata;

store a pointer to the TLB metadata buffer entry as an active TLB metadata pointer;

receive a first memory access request comprising a first virtual address (VA); and responsive to receiving the first memory access request, generate a TLB entry in the TLB for the first VA, the TLB entry comprising a TLB tag that stores the active TLB metadata pointer in lieu of the TLB metadata of the TLB metadata buffer entry.

What is claimed is:

1. A processor device, comprising:
a translation lookaside buffer (TLB) comprising a plurality of TLB entries;
a TLB metadata buffer comprising a plurality of TLB metadata buffer entries each configured to store corresponding TLB metadata; and
a memory management unit (MMU) configured to:
receive a first memory access request comprising a first virtual address (VA); and
responsive to receiving the first memory access request, access a TLB entry for the first VA among the plurality of TLB entries of the TLB, based on an active TLB metadata pointer to a TLB metadata buffer entry among the plurality of TLB metadata buffer entries,
wherein the MMU is further configured to, prior to receiving the first memory access request:
select the TLB metadata buffer entry among the plurality of TLB metadata buffer entries for use in accessing the TLB;
store a pointer to the TLB metadata buffer entry as the active TLB metadata pointer;
receive a second memory access request comprising the first VA; and
responsive to receiving the second memory access request, generate the TLB entry in the TLB for the first VA, the TLB entry comprising a TLB tag that stores the active TLB metadata pointer in lieu of the TLB metadata of the TLB metadata buffer entry.

2. The processor device of claim 1, wherein the MMU is configured to access the TLB entry among the plurality of TLB entries of the TLB based on the active TLB metadata pointer by matching the active TLB metadata pointer with a TLB tag of the TLB entry.

3. The processor device of claim 1, wherein:
each TLB metadata buffer entry of the plurality of TLB metadata buffer entries is configured to store the corresponding TLB metadata comprising an Application Space Identifier (ASID) and a Virtual Machine Identifier (VMID) of a processor context; and
the MMU is configured to select the TLB metadata buffer entry among the plurality of TLB metadata buffer entries for use in accessing the TLB by being configured to:
detect a processor context switch to a new context associated with an ASID and a VMID; and
select the TLB metadata buffer entry storing the corresponding TLB metadata comprising the ASID and the VMID of the new context for use in accessing the TLB.

4. The processor device of claim 3, wherein the MMU is further configured to, prior to selecting the TLB metadata buffer entry storing the corresponding TLB metadata comprising the ASID and the VMID of the new context for use in accessing the TLB:
determine that no TLB metadata buffer entry storing corresponding TLB metadata comprising the ASID and the VMID of the new context exists among the plurality of TLB metadata buffer entries; and
responsive to determining that no TLB metadata buffer entry storing corresponding TLB metadata comprising the ASID and the VMID of the new context exists among the plurality of TLB metadata buffer entries:
allocate the TLB metadata buffer entry; and
store the ASID and the VMID of the new context as the TLB metadata of the TLB metadata buffer entry.

5. The processor device of claim 3, wherein:
the MMU comprises an active pointer table comprising a plurality of active pointer table entries each associating an active TLB metadata pointer with a corresponding translation regime;
each TLB metadata buffer entry of the plurality of TLB metadata buffer entries is configured to store the corresponding TLB metadata further comprising a translation regime indicator; and
the MMU is configured to store the pointer to the TLB metadata buffer entry as the active TLB metadata pointer by being configured to store the pointer to the TLB metadata buffer entry in an active pointer table entry, corresponding to a translation regime indicated by the translation regime indicator of the TLB metadata buffer entry, of the plurality of active pointer table entries of the active pointer table.

6. The processor device of claim 5, wherein:
each TLB metadata buffer entry of the plurality of TLB metadata buffer entries is configured to store the corresponding TLB metadata further comprising a global indicator;
each active pointer table entry of the plurality of active pointer table entries further comprises a global active TLB metadata pointer; and
the MMU is configured to store the pointer to the TLB metadata buffer entry in the active pointer table entry corresponding to the translation regime indicated by the translation regime indicator of the TLB metadata buffer entry by being configured to:
determine that the global indicator of the TLB metadata buffer entry is set; and
responsive to determining that the global indicator of the TLB metadata buffer entry is set, store the pointer to the TLB metadata buffer entry as the global active TLB metadata pointer of the active pointer table entry.

7. The processor device of claim 3, wherein the MMU is further configured to, subsequent to detecting the processor context switch to the new context associated with the ASID and the VMID, invalidate one or more least-recently-used TLB metadata buffer entries of the plurality of TLB metadata buffer entries.

8. The processor device of claim 1, wherein:
each TLB metadata buffer entry of the plurality of TLB metadata buffer entries is configured to store the corresponding TLB metadata comprising a plurality of upper bits of a VA;
the MMU comprises an active pointer table comprising a plurality of active pointer table entries each associating an active TLB metadata pointer with a corresponding processor pipeline of a plurality of processor pipelines;

the MMU is configured to select the TLB metadata buffer entry among the plurality of TLB metadata buffer entries for use in accessing the TLB by being configured to:

receive a third memory access request comprising a second VA and associated with a processor pipeline of a plurality of processor pipelines of the processor device; and select the TLB metadata buffer entry storing the corresponding TLB metadata comprising a plurality of upper bits of the second VA for use in accessing the TLB; and the MMU is configured to store the pointer to the TLB metadata buffer entry as the active TLB metadata pointer by being configured to store the pointer to the TLB metadata buffer entry in an active pointer table entry, corresponding to the processor pipeline, of the plurality of active pointer table entries of the active pointer table.

9. The processor device of claim 8, wherein the MMU is further configured to, prior to selecting the TLB metadata buffer entry storing the corresponding TLB metadata comprising the plurality of upper bits of the second VA for use in accessing the TLB:

determine that no TLB metadata buffer entry storing corresponding TLB metadata comprising the plurality of upper bits of the second VA exists among the plurality of TLB metadata buffer entries; and responsive to determining that no TLB metadata buffer entry storing corresponding TLB metadata comprising the plurality of upper bits of the second VA exists among the plurality of TLB metadata buffer entries:

allocate the TLB metadata buffer entry; and store the plurality of upper bits of the second VA as the TLB metadata of the TLB metadata buffer entry.

10. The processor device of claim 1, integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

11. A method for compressing translation lookaside buffer (TLB) tags using a TLB metadata buffer, comprising:

receiving, by a memory management unit (MMU) of a processor device, a first memory access request comprising a first virtual address (VA); and responsive to receiving the first memory access request, accessing, by the MMU, a TLB entry for the first VA among a plurality of TLB entries of a TLB, based on an active TLB metadata pointer to a TLB metadata buffer entry among a plurality of TLB metadata buffer entries of a TLB metadata buffer, each TLB metadata buffer entry configured to store corresponding TLB metadata, wherein prior to receiving the first memory access request:

selecting, by the MMU, the TLB metadata buffer entry among the plurality of TLB metadata buffer entries for use in accessing the TLB;

storing, by the MMU, a pointer to the TLB metadata buffer entry as the active TLB metadata pointer;

receiving, by the MMU, a second memory access request comprising the first VA; and responsive to receiving the second memory access request, generating, by the MMU, the TLB entry in the TLB for the first VA, the TLB entry comprising a TLB tag that stores the active TLB metadata pointer in lieu of the TLB metadata of the TLB metadata buffer entry.

12. The method of claim 11, wherein:

each TLB metadata buffer entry of the plurality of TLB metadata buffer entries is configured to store the corresponding TLB metadata comprising an Application Space Identifier (ASID) and a Virtual Machine Identifier (VMID) of a processor context; and selecting the TLB metadata buffer entry among the plurality of TLB metadata buffer entries for use in accessing the TLB comprises:

detecting a processor context switch to a new context associated with an ASID and a VMID; and selecting the TLB metadata buffer entry storing the corresponding TLB metadata comprising the ASID and the VMID of the new context for use in accessing the TLB.

13. The method of claim 12, further comprising, prior to selecting the TLB metadata buffer entry storing the corresponding TLB metadata comprising the ASID and the VMID of the new context for use in accessing the TLB:

determining, by the MMU, that no TLB metadata buffer entry storing corresponding TLB metadata comprising the ASID and the VMID of the new context exists among the plurality of TLB metadata buffer entries; and responsive to determining that no TLB metadata buffer entry storing corresponding TLB metadata comprising the ASID and the VMID of the new context exists among the plurality of TLB metadata buffer entries:

allocating, by the MMU, the TLB metadata buffer entry; and storing, by the MMU, the ASID and the VMID of the new context as the TLB metadata of the TLB metadata buffer entry.

14. The method of claim 11, wherein:

the MMU comprises an active pointer table comprising a plurality of active pointer table entries each associating an active TLB metadata pointer with a corresponding translation regime;

each TLB metadata buffer entry of the plurality of TLB metadata buffer entries is configured to store the corresponding TLB metadata further comprising a translation regime indicator; and storing the pointer to the TLB metadata buffer entry as the active TLB metadata pointer comprises storing the pointer to the TLB metadata buffer entry in an active pointer table entry, corresponding to a translation regime indicated by the translation regime indicator of the TLB metadata buffer entry, of the plurality of active pointer table entries of the active pointer table.

15. The method of claim 14, wherein:

each TLB metadata buffer entry of the plurality of TLB metadata buffer entries is configured to store the corresponding TLB metadata further comprising a global indicator;

each active pointer table entry of the plurality of active pointer table entries further comprises a global active TLB metadata pointer; and storing the pointer to the TLB metadata buffer entry in the active pointer table entry corresponding to the translation regime indicated by the translation regime indicator of the TLB metadata buffer entry comprises:
- determining that the global indicator of the TLB metadata buffer entry is set; and
- responsive to determining that the global indicator of the TLB metadata buffer entry is set, storing the pointer to the TLB metadata buffer entry as the global active TLB metadata pointer of the active pointer table entry.

16. The method of claim 12, wherein:
each TLB metadata buffer entry of the plurality of TLB metadata buffer entries is configured to store the corresponding TLB metadata comprising a plurality of upper bits of a VA;

the MMU comprises an active pointer table comprising a plurality of active pointer table entries each associating an active TLB metadata pointer with a corresponding processor pipeline of a plurality of processor pipelines;

selecting the TLB metadata buffer entry among the plurality of TLB metadata buffer entries for use in accessing the TLB comprises:
- receiving a third memory access request comprising a second VA and associated with a processor pipeline of a plurality of processor pipelines of the processor device; and
- selecting the TLB metadata buffer entry storing the corresponding TLB metadata comprising a plurality of upper bits of the second VA for use in accessing the TLB; and storing the pointer to the TLB metadata buffer entry as the active TLB metadata pointer comprises storing the pointer to the TLB metadata buffer entry in an active pointer table entry, corresponding to the processor pipeline, of the plurality of active pointer table entries of the active pointer table.

17. The method of claim 16, further comprising, prior to selecting the TLB metadata buffer entry storing the corresponding TLB metadata comprising the plurality of upper bits of the second VA for use in accessing the TLB:
- determining that no TLB metadata buffer entry storing corresponding TLB metadata comprising the plurality of upper bits of the second VA exists among the plurality of TLB metadata buffer entries; and
- responsive to determining that no TLB metadata buffer entry storing corresponding TLB metadata comprising the plurality of upper bits of the second VA exists among the plurality of TLB metadata buffer entries:
  - allocating the TLB metadata buffer entry; and
  - storing the plurality of upper bits of the second VA as the TLB metadata of the TLB metadata buffer entry.

* * * * *